(12) United States Patent
Ando et al.

(10) Patent No.: US 7,830,935 B2
(45) Date of Patent: Nov. 9, 2010

(54) LASER

(75) Inventors: Minoru Ando, Yamanashi (JP); Eiji Kobayashi, Yamanashi (JP); Satoshi Kagiwada, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 299 days.

(21) Appl. No.: 12/078,394

(22) Filed: Mar. 31, 2008

(65) Prior Publication Data

US 2008/0267235 A1 Oct. 30, 2008

(30) Foreign Application Priority Data

Apr. 26, 2007 (JP) .............................. 2007-117160

(51) Int. Cl.
*H01S 3/00* (2006.01)
(52) U.S. Cl. .............. 372/38.02; 372/38.03; 372/38.04; 372/38.09; 372/29.012; 372/29.015
(58) Field of Classification Search ............. 372/38.02, 372/38.03, 38.04, 38.09, 29.012, 29.015
See application file for complete search history.

(56) References Cited

U.S. PATENT DOCUMENTS

2007/0195470 A1* 8/2007 Zhang et al. .................. 361/42

FOREIGN PATENT DOCUMENTS

| CN | 1102911 A | 5/1995 |
|---|---|---|
| JP | 52-109533 | 8/1977 |
| JP | 6-334249 | 12/1994 |
| JP | 8-322140 | 12/1996 |
| JP | 2003-46172 | 2/2003 |
| JP | 2004-241605 | 8/2004 |
| JP | 2006-135205 | 5/2006 |

OTHER PUBLICATIONS

Japanese Notice of Reasons for Rejection mailed Sep. 30, 2008 issued in Japanese Application No. 2007-117160 (including a partial translation thereof).
Japanese Notice of Reasons for Rejection mailed Jul. 8, 2008 issued in Japanese Application No. 2007-117160 (including a partial translation thereof).
Chinese Notification of the First Office Action mailed May 12, 2010 in Chinese Patent Application No. 200810092372.6 (including an English-language translation thereof).

* cited by examiner

*Primary Examiner*—Dung T Nguyen
(74) *Attorney, Agent, or Firm*—Drinker Biddle & Reath LLP

(57) ABSTRACT

A laser (10) provided with a discharge activation power supply (11) supplied with power from a 3-phase AC power line, the discharge activation power supply (11) provided inside it with three first capacitors (12a, 12b, and 12c), the laser (10) including an external ground fault protection device comprising a voltage measuring unit using the first capacitors (12a, 12b, and 12c) to measure voltages between the phases of the 3-phase AC power line and the ground and a power breaking unit (18) comparing the values of voltages measured by the voltage measuring unit and a predetermined threshold and breaking the supply of power from the 3-phase AC power line to the power supply (11) when the value of a voltage exceeds the threshold.

4 Claims, 1 Drawing Sheet

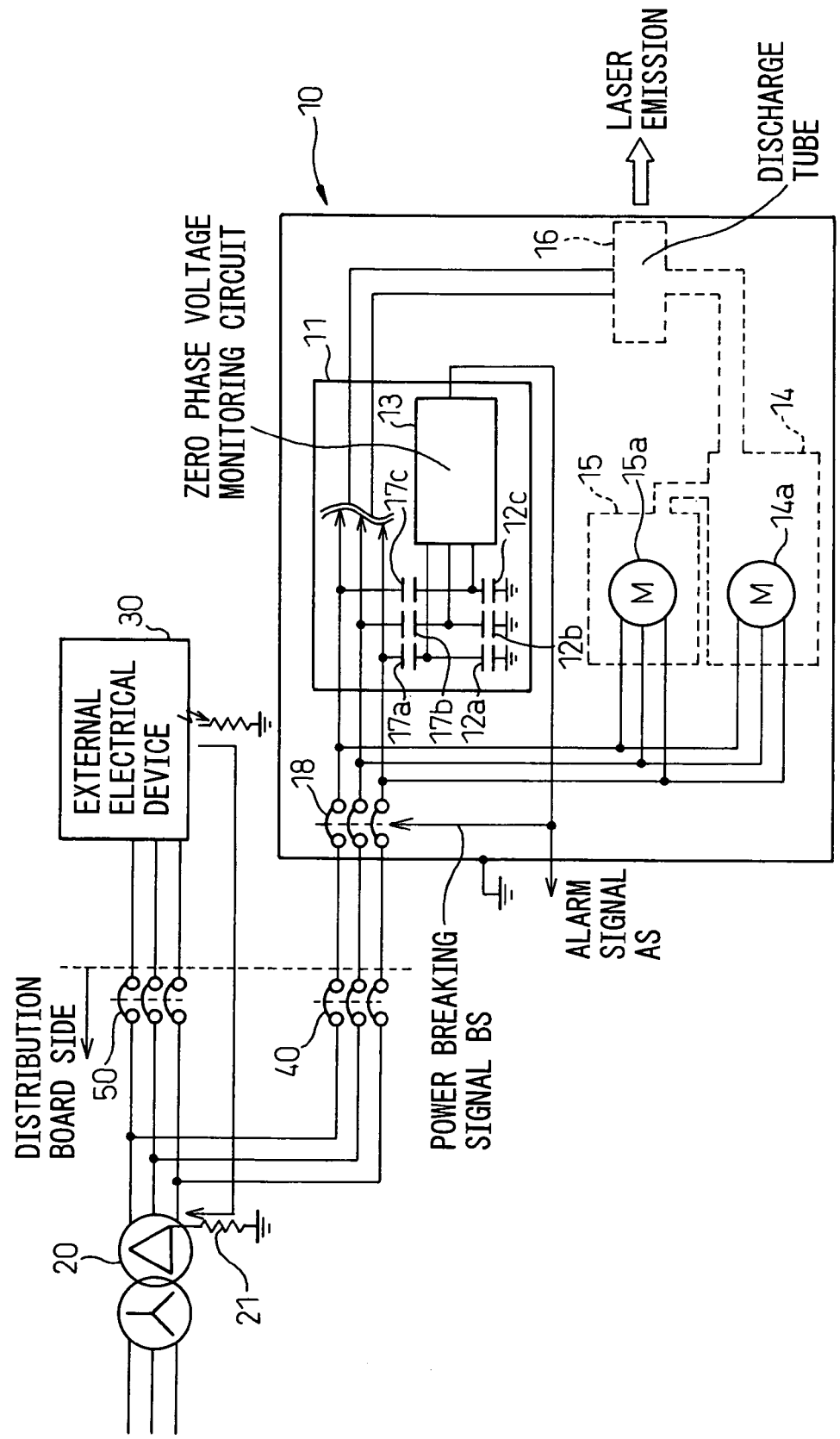

LASER

The applicant claims the right to priority based on Japanese Patent Application No. 2007-117160 filed on Apr. 26, 2007, the entire content of which is hereby incorporated by reference.

BACKGROUND OF THE INVENTION

1. Field of the Invention

The present invention relates to a laser, more particularly relates to a laser having an external ground fault protection device.

2. Description of the Related Art

In the past, lasers have been broadly used in the fields of cutting, welding, surface treatment, and other processing. In particular, $CO_2$ gas lasers are high in efficiency and give a high output, so are being used in the field of laser processing.

A $CO_2$ gas laser uses a blower to make the laser gas containing the $CO_2$ gas circulate while flowing at a high speed between the discharge electrodes so as to raise the output of the laser. Further, the motor of this blower is arranged in a gas circulation path through which the laser gas circulates. This motor is used in a state where its withstand voltage drops compared with under atmospheric pressure since it operates under a reduced pressure. Further, this type of laser operates by receiving the supply of power from a 3-phase AC power line.

Among the factories where such $CO_2$ gas lasers operate, many factories were built considerably long years ago. Many factories may even be found not equipped with protection devices against ground faults of electrical equipment. If a ground fault occurs in electrical equipment in such a factory, the $CO_2$ gas laser electrically connected to the same wiring system as this electrical equipment will experience an abnormal rise in the voltage between the phase of the power supply where the ground fault occurs and the ground and in some cases the motor of the blower will experience insulation breakdown.

To prevent such an accident due to an external ground fault, there are devices using a zero phase current detection current transformer (CT) or zero phase voltage detection voltage transformer (PT) etc. to detect an external ground fault. However, these are bulky in themselves and are also high in price. These factors become obstacles in newly introducing devices for prevention of external ground faults.

On the other hand, ground fault detection devices of electrical systems where motors are connected as loads have been proposed.

For example, Japanese Patent Publication (A) No. 8-322140 discloses a ground fault detection device suppressing saturation of a current transformer by the DC component of a rush current at the time of motor startup to enable prevention of unnecessary operation of a motor protection electric relay and proposes the means of using a coil to detect a ground fault.

However, what the ground fault detection device described in Japanese Patent Publication (A) No. 8-322140 detects is a ground fault inside the unit. It was difficult to detect an external ground fault.

SUMMARY OF THE INVENTION

Therefore, an object of the present invention is to provide a laser having a simply structured, inexpensive external ground fault protection device.

To achieve the above object, the laser of the present invention is a laser provided with a power supply supplied with power from a 3-phase AC power line, the power supply provided inside it with capacitors, the laser including an external ground fault protection device comprising a voltage measuring unit using the capacitors to measure voltages between the phases of the 3-phase AC power line and a ground and a power breaking unit comparing the values of voltages measured by the voltage measuring unit and a predetermined threshold and breaking the supply of power from the 3-phase AC power line to the power supply when the value of a voltage exceeds the threshold.

Further, preferably the capacitors are three capacitors, the capacitors are respectively connected between the phases of the 3-phase AC power line and the ground, and the voltage measuring unit measures the voltages between the phases and the capacitors.

Further, the laser of the present invention preferably has an alarm unit outputting an alarm when the value of a voltage measured by the voltage measuring unit exceeds the threshold.

Further, preferably the laser is a gas laser, the laser has a blower making the laser gas circulate and a vacuum pump, the blower and the vacuum pump respectively have motors driven under reduced pressure, the motors respectively receive the supply of power by the 3-phase AC power line, and the power breaking unit breaks the supply of power from the 3-phase AC power line to the power supply and breaks the supply of power to the motors when the value of a voltage measured by the voltage measuring unit exceeds the threshold.

The terms used in the claims are not limited to the specific meanings described in the specification (for example, the embodiments).

According to the laser provided with an external ground fault protection device of the present invention, the external ground fault protection device has a simple structure, is inexpensive, and protects the laser from external ground fault.

DESCRIPTION OF THE DRAWINGS

These and other features and advantages of the present invention will be better understood by reading the following detailed description, taken together with the drawing.

FIG. 1 is a circuit diagram showing an embodiment of a laser of the present invention.

DETAILED DESCRIPTION

Below, a laser of the present invention will be explained based on a preferred embodiment with reference to the drawings.

The laser 10 of the present embodiment, as shown in FIG. 1, is provided with a discharge activation power supply 11 supplied with power from a 3-phase AC power line. This discharge activation power supply 11 is provided inside it with three first capacitors 12a, 12b, and 12c.

Further, the laser 10 has an external ground fault protection device comprised of a voltage measuring unit utilizing the first capacitors 12a, 12b, and 12c to measure the voltages between the phases of the 3-phase AC power line and a ground and a power breaking unit 18 comparing the values of the voltages measured by the voltage measuring unit and a predetermined threshold and breaking the supply of power from the 3-phase AC power line to the discharge activation power supply 11 when the value of a voltage exceeds a threshold.

The laser 10 is a $CO_2$ gas laser using a laser gas including $CO_2$ gas to emit a laser beam. The emitted laser beam can be used for laser cutting, laser welding, or other laser processing. FIG. 1 is a circuit diagram showing the laser 10. Note that FIG. 1 shows only the principal parts of the laser 10 for facilitating the explanation.

The laser 10, as shown in FIG. 1, has a discharge tube 16 exciting and emitting a laser beam, a discharge activation power supply 11 supplying power to the discharge tube, a breaker 18 opening and closing the electrical connection between a 3-phase AC power line outside the laser and a discharge activation power supply 11, a blower 14 circulating laser gas in the discharge tube 16, and a vacuum pump 15 reducing the pressure in a gas circulation path through which the laser gas circulates. Further, the laser gas is supplied from a not shown gas tank to the laser 10.

Further, the laser 10, as shown in FIG. 1, is electrically connected to the secondary side of the 3-phase AC transformer 20 through the breaker 40. At the secondary side of this 3-phase AC transformer 20, an external electrical device 30 is connected through a breaker 50. The external electrical device 30 and the laser 10 are arranged in the same wiring system. The breaker 40 and breaker 50 are arranged at the same distribution board. Further, the neutral point of the 3-phase AC transformer 20 is grounded through a ground resistance 21.

Below, the laser 10 will be further explained. The discharge tube 16 of the laser 10 is supplied with a high frequency generated by a not shown high frequency generation circuit supplied with power from the discharge activation power supply 11 whereby it excites the laser gas and generates a laser beam. As the laser generating system in the discharge tube 16, the high speed axial flow type, 3-axis orthogonal type, gas slab type, etc. may be used.

The discharge activation power supply 11 of the laser 10 receives the supply of power of the 3-phase AC power line from the breaker 40 through the breaker 18. The discharge activation power supply 11 has, as noise filters, three first capacitors 12a, 12b, and 12c inside it. The first capacitors 12a, 12b, and 12c, as shown in FIG. 1, are respectively electrically connected between the phases of the 3-phase AC power line and the ground. The first capacitors 12a, 12b, and 12c may also be directly grounded to the ground. Alternatively, the first capacitors 12a, 12b, and 12c are grounded to the housing at the laser 10. The housing may also be grounded to the ground.

Further, in the discharge activation power supply 11, second capacitors 17a, 17b, and 17c are further arranged between the phases of the 3-phase AC power line and the first capacitors 12a, 12b, and 12c.

Further, the discharge activation power supply 11 of the laser 10 has a zero phase voltage monitoring circuit 13. The zero phase voltage monitoring circuit 13 has the action of breaking the supply of power from the 3-phase AC power line to the discharge activation power supply 11 when a ground fault occurs in another device in the same wiring system so as to prevent damage to the discharge activation power supply 11 and protect the laser 10 from an external ground fault.

The zero phase voltage monitoring circuit 13 measures the voltages between the first capacitor 12a and second capacitor 17a, between the first capacitor 12b and second capacitor 17b, and between the first capacitor 12c and second capacitor 17c. The zero phase voltage monitoring circuit 13 compares the values of the voltages and a predetermined threshold. When the value of a voltage rises and exceeds the threshold, it outputs a power breaking signal BS to the breaker 18 to break the supply of power from the 3-phase AC power line to the discharge activation power supply 11. That is, in the laser 10, the voltage measuring unit is comprised of the first capacitors 12a, 12b, 12c and the zero phase voltage monitoring circuit 13.

In the laser 10, the same value is used in each phase as the threshold of the zero phase voltage monitoring circuit 13. This threshold is preferably larger than the maximum value of the voltage fluctuations which can occur at normal times and smaller than the smallest voltage value by which an external ground fault causes the laser 10 to sustain damage.

Specifically, the threshold is preferably set to about 150% of the effective voltage value at each phase at the time of normal voltage where no external ground fault occurs.

The first capacitors 12a, 12b, and 12c preferably have the same electrostatic capacities from the viewpoint of balancing the load. The same is true for the electrostatic capacities of the second capacitors 17a, 17b, and 17c.

The second capacitors 17a, 17b, and 17c preferably have electrostatic capacities smaller than those of the first capacitors 12a, 12b, and 12c from the viewpoint of increasing the voltage drops at the capacitors and setting the voltages measured by the zero phase voltage monitoring circuit 13 low at all times.

The electrostatic capacities of the first capacitors 12a, 12b, and 12c and the second capacitors 17a, 17b, and 17c are preferably suitably set in accordance with the characteristics of the discharge activation power supply 11, but in general the composite capacities of 12a and 17a, 12b and 17b, and 12c and 17c are in the range of 3.8 nF to 5.6 nF.

As such first capacitors 12a, 12b, and 12c and second capacitors 17a, 17b, and 17c, for example, it is possible to use ceramic capacitors, film capacitors, etc. As the first capacitors 12a, 12b, and 12c, in particular use of ceramic capacitors is preferable from the viewpoint of reduction of the impedance noise.

Explaining this example of an external ground fault more specifically, in FIG. 1, the external electrical device 30 is arranged in the same wiring system as the laser 10. In this external electrical device 30, when a ground fault occurs in one phase of the 3-phase AC power line, the ground fault current flows to the ground resistance 21 connected to the neutral point of the 3-phase AC transformer 20 as a ground fault current. The zero phase voltage rises by exactly the amount of the product of this ground fault current and the electrical resistance value of the ground resistance 21.

On the other hand, in the laser 10, if a ground fault occurs in the external electrical device 30, the voltage of the same phase as the phase of the 3-phase AC power line where the ground fault occurred becomes zero in the device. The other two phases are increased in voltages by exactly the amounts of rise of the zero phase voltage. Further, for example, while explained in detail later, at the power terminal parts of the motors 14a and 15a placed under a reduced pressure, the voltage differences between the phase where the ground fault occurred and the normal phases increases and insulation breakdown easily occurs.

As a result, the voltage at the location measured by the voltage measuring unit also increases in accordance with the increase in the zero phase voltage. Specifically, the amount of increase of the voltage of the location measured by the voltage measuring unit is found from the amount of increase of the zero phase voltage and the values of the electrostatic capacities of the first capacitor and second capacitor.

The breaker 18 of the laser 10 has an external pullout function and opens and closes the electrical connection between the breaker 40 outside the laser 10 and the discharge activation power supply 11. When the breaker 18 receives as input, as the power breaking unit, a power breaking signal from the zero phase voltage monitoring circuit 13, the supply of power from the breaker 40 to the discharge activation power supply 11 is broken. The breaker 18 is a so-called "main breaker". This breaker 18 and the breakers 40 and 50 are preferably no-fuse breakers.

Further, the laser 10 has an alarm unit outputting an alarm when the value of a voltage measured by the voltage measuring unit exceeds the threshold. In the laser 10, the zero phase voltage monitoring circuit 13 is provided with an alarm unit. The zero phase voltage monitoring circuit 13 outputs an alarm signal AS when the value of a voltage exceeds the threshold. When receiving this alarm signal as input, the alarm unit emits an alarm sound, turns on a rotating light, or issues another alarm to notify the occurrence of external ground fault.

Next, the vacuum pump 15 and the blower 14 of the laser 10 will be explained. In the laser 10, at the time of startup, the vacuum pump 15 is used to reduce the pressure in the gas circulation path including the discharge tube 16 down to a predetermined value. After this, the laser gas is supplied from the gas tank to the inside of the gas circulation path. During operation of the laser 10, the gas pressure in the gas circulation path is controlled to a predetermined range by control of the supply of gas from the gas tank and the exhaust of gas by the vacuum pump 15.

Further, the blower 14 and the vacuum pump 15, as shown in FIG. 1, have motors 14a and 15a driven under a reduced pressure. FIG. 1 shows the range under the reduced pressure state during operation of the laser 10. This reduced pressure state includes cases where there is no laser gas present such as the time of startup of the laser 10 and the case where laser gas is present such as during operation of the laser 10.

In this way, the motors 14a and 15a are usually placed under a reduced pressure. In general, they are used under a pressure of several hundred Pa to 14000 Pa. Under this reduced pressure, insulation breakdown occurs more easily than under atmospheric pressure. The motors 14a and 15a are therefore in environments where if an external ground fault occurs and the zero phase voltage rises, this rise in voltage can easily result in insulation breakdown.

In the laser 10, these motors 14a and 15a, like the discharge activation power supply 11, receive the supply of power of the 3-phase AC power line from the breaker 40 through the main breaker, that is, the breaker 18. Therefore, when the value of the voltage measured by the voltage measuring unit exceeds the threshold, the power breaking unit breaks the supply of power from the 3-phase AC power line to the discharge activation power supply 11 and breaks the supply of power to the motors 14a and 15a.

In this way, the external ground fault protection device of the laser 10 is comprised of the voltage measuring unit and the power breaking unit.

Next, an example of the operation of the above-mentioned laser 10 will be explained below. First, by closing the breaker 18, the power from the 3-phase AC power line is supplied to the discharge activation power supply 11, the discharge tube 16, blower 14, vacuum pump 15, etc. are started up and the laser enters the operating state in accordance with a predetermined routine.

Further, the motors 14a and 15a of the blower 14 and vacuum pump 15 are driven under a predetermined reduced pressure.

When no external ground fault occurs, the values of the voltages measured by the voltage measuring unit comprised of the first capacitors 12a, 12b, 12c and zero phase voltage monitoring circuit 13 do not exceed the threshold, so the zero phase voltage monitoring circuit 13 never outputs the power breaking signal BS and alarm signal AS.

On the other hand, if a ground fault occurs in an external electrical device 30 arranged in the same wiring system as the laser 10 and the value of a voltage measured by the voltage measuring unit rises and exceeds the threshold, the zero phase voltage monitoring circuit 13 outputs the power breaking signal BS to the breaker 18 and outputs the alarm signal AS to the alarm unit.

Further, when receiving the power breaking signal BS as input, the breaker 18 opens the electrical connection between the breaker 40 and the discharge activation power supply 11 and breaks the supply of power to the motors 14a and 15a.

Note that in the example shown in FIG. 1, there was a single external electrical device arranged in the same wiring system as the laser 10, but a plurality of the external electrical devices is provided. Even if one of the external electrical devices suffers from a ground fault, the laser 10 protects itself from the external ground fault in the same way as explained above.

According to the above-mentioned laser 10, the external ground fault protection device reliably protects itself from an external ground fault. Specifically, this external ground fault protection device protects the discharge activation power supply 11 from an external ground fault and protects the motors 14a, 15a operating in a state susceptible to insulation breakdown under reduced pressure from an external ground fault. Further, this external ground fault protection device is comprised utilizing the first capacitors 12a, 12b, and 12c provided in the discharge activation power supply 11, so has a simple structure and is inexpensive.

Further, in the laser 10, even if a ground fault occurs inside it, the zero phase voltage monitoring circuit 13 breaks the supply of power to the discharge activation power supply 11 etc., so it is possible to keep the damage due to its own ground fault to a minimum.

The laser of the present invention is not limited to the above embodiment and can be suitably modified so long as not departing from the gist of the present invention.

For example, the laser of the present invention was explained with reference to an example of a $CO_2$ gas laser as an embodiment, but may also be a laser using another type of laser gas to emit laser light and further may also be a laser exciting a liquid or solid medium to emit laser light.

Further, in the laser 10, the zero phase voltage monitoring circuit 13 monitored the rise in voltage, but may also monitor the drop in voltage of the same phase as the phase where the ground fault occurred in the external electrical device 30. In this case, the time when the value of the voltage measured by the voltage measuring unit exceeds a threshold means the case where the measured value of the voltage exceeds the threshold and falls.

Further, in the laser 10, the same value of the threshold of the zero phase voltage monitoring circuit 13 is used in the different phases, but it is also possible to use different values in the phases. Further, in the laser 10, the second capacitors 17a, 17b, and 17c need not be provided.

Further, in the laser 10, the motors 14a and 15a were arranged under a reduced pressure, but when the zero phase voltage rises, only locations susceptible to insulation breakdown may be arranged under reduced pressure.

What is claimed is:

1. A laser comprising:
   a power supply provided with noise filter capacitors inside it and supplied with power from a 3-phase AC power line and
   an external ground fault protection device comprising a voltage measuring unit using said capacitors to measure voltages between each of the phases of said 3-phase AC power line and a ground and a power breaking unit comparing the values of voltages measured by said voltage measuring unit and a predetermined threshold and breaking the supply of power from said 3-phase AC power line to said power supply when the value of a voltage exceeds the threshold, wherein the laser is arranged in the same wiring system as an external electrical device so that when a ground fault occurs in the external electrical device, the external ground fault protection device is configured to break the supply of power from the 3-phase AC power line to the power supply.

2. A laser as set forth in claim 1, wherein the capacitors are three capacitors, the capacitors are respectively connected between the phases of said 3-phase AC power line and said ground, and said voltage measuring unit measures the voltages between said phases and said capacitors.

3. A laser as set forth in claim 1, further comprising an alarm unit outputting an alarm when the value of a voltage measured by said voltage measuring unit exceeds said threshold.

4. A laser as set forth in claim 1, wherein said laser is a gas laser, the laser has a blower making the laser gas circulate and a vacuum pump, the blower and the vacuum pump respectively have motors driven under reduced pressure, said motors respectively receive the supply of power by said 3-phase AC power line, and said power breaking unit breaks the supply of power from said 3-phase AC power line to said power supply and breaks the supply of power to said motors when the value of a voltage measured by said voltage measuring unit exceeds said threshold.

* * * * *